(12) United States Patent
Wang et al.

(10) Patent No.: US 10,948,579 B2
(45) Date of Patent: Mar. 16, 2021

(54) METHOD AND DEVICE FOR DESIGNING AND OPTIMIZING MULTI-DEGREE-OF-FREEDOM FREQUENCY-MODULATION SIGNAL

(71) Applicant: Institute of Electronics, Chinese Academy of Sciences, Beijing (CN)

(72) Inventors: Yu Wang, Beijing (CN); Guodong Jin, Beijing (CN); Yunkai Deng, Beijing (CN); Yajun Long, Beijing (CN); Wei Wang, Beijing (CN)

(73) Assignee: Institute of Electronics, Chinese Academy of Sciences, Beijing (CN)

( * ) Notice: Subject to any disclaimer, the term of this patent is extended or adjusted under 35 U.S.C. 154(b) by 178 days.

(21) Appl. No.: 16/194,803

(22) Filed: Nov. 19, 2018

(65) Prior Publication Data

US 2019/0293774 A1  Sep. 26, 2019

(30) Foreign Application Priority Data

Mar. 20, 2018  (CN) .......................... 201810231600.7

(51) Int. Cl.
*G01S 13/34*  (2006.01)
*G01S 7/35*  (2006.01)
(Continued)

(52) U.S. Cl.
CPC ............... *G01S 13/34* (2013.01); *G01S 7/35* (2013.01); *G01S 13/006* (2013.01); *G06N 3/086* (2013.01); *G01S 13/90* (2013.01)

(58) Field of Classification Search
CPC .......... G01S 13/34; G01S 7/35; G01S 13/006; G01S 13/90; G06N 3/086
(Continued)

(56) References Cited

U.S. PATENT DOCUMENTS

| 3,766,477 A | * | 10/1973 | Cook | H04L 27/103 375/130 |
| 2007/0071246 A1 | * | 3/2007 | Miyagi | H04H 20/72 381/15 |
| 2017/0192408 A1 | * | 7/2017 | Nazarathy | G05B 13/04 |

FOREIGN PATENT DOCUMENTS

WO  WO-2015186133 A1 * 12/2015 ............. G05B 13/04

OTHER PUBLICATIONS

"Streamlining Digital Signal Processing. A Tricks of the Trade Guidebook", A John Wiley & Sons, Inc., Publication. Copyright © 2012 by the Institute of Electrical and Electronics Engineers.• Edited by Richard G. Lyons (Year: 2012).*

(Continued)

*Primary Examiner* — Vladimir Magloire
*Assistant Examiner* — Alexander L. Syrkin
(74) *Attorney, Agent, or Firm* — Arent Fox LLP; Michael Fainberg

(57) ABSTRACT

Provided are a method and device for designing and optimizing a multi-degree-of-freedom frequency-modulation (FM) signal, and a computer storage medium. The method includes that: a time domain function of the multi-degree-of-freedom FM signal is determined; the constraint condition and the objective function of multi-degree-of-freedom FM signal optimization are established; an algorithm model of augmented Lagrangian genetic algorithm is determined based on the constraint condition and the objective function; characteristic parameters of the first iteration of the algorithm model are initialized, where the characteristic parameters of the first iteration at least include the Lagrange multiplier of the first iteration and the offset of the first iteration; initialization signal of the multi-degree-of-freedom FM signal is acquired, and initialization frequency (Continued)

control points of the initialization signal are determined based on the initialization signal.

20 Claims, 6 Drawing Sheets

(51) Int. Cl.
    *G01S 13/00*     (2006.01)
    *G06N 3/08*     (2006.01)
    *G01S 13/90*     (2006.01)

(58) Field of Classification Search
    USPC .......................................................... 342/200
    See application file for complete search history.

(56) References Cited

OTHER PUBLICATIONS

Edited by Richard G. Lyons "Streamlining Digital Signal Processing. A Tricks of the Trade Guidebook", A John Wiley & Sons, Inc., Publication. Copyright © 2012 by the Institute of Electrical and Electronics Engineers. (Year: 2012).*

* cited by examiner

METHOD AND DEVICE FOR DESIGNING AND OPTIMIZING MULTI-DEGREE-OF-FREEDOM FREQUENCY-MODULATION SIGNAL

CROSS-REFERENCE TO RELATED APPLICATION

The present application claims benefit of Chinese Application No. 201810231600.7, filed on Mar. 20, 2018, the contents of which are hereby incorporated by reference in its entirety.

TECHNICAL FIELD

The disclosure relates to a field of radar transmit signal waveform design and optimization, and in particular to a method and a device for designing and optimizing a multi-degree-of-freedom frequency-modulation (FM) signal.

BACKGROUND

Linear frequency modulation (LFM) signal has the high-resolution imaging capability. Thus, it is widely used in the modern advanced radar, such as synthetic aperture radar (SAR). The sidelobe level caused by the radar using the LFM signal is high. In order to suppress false information caused by the target sidelobe and maintain phase information, generally, windowing process is performed. However, the sidelobe suppression through the windowing process will result in the problem of reducing the signal-to-noise ratio (SNR) of radar system. For example, after the windowing process is performed on the existing SAR radar signal, such as the TerraSAR-X in the German Aerospace Center (DLR) and the Cosmo-SkyMed, the SNR of the radar system is reduced by about 1 to 2 dB, which is equivalent that the energy of transmitter is reduced by 20% to 37%. In order to overcome the problem of SNR loss caused by the sidelobe suppression, the multi-degree-of-freedom FM signal is favored by many radar signal designers. The multi-degree-of-freedom FM signal can maintain the SNR of the radar system while performing the sidelobe suppression through the windowing process.

In addition, when the windowing process is performed on the LFM signal for the sidelobe suppression, it will inevitably result in a widened main lobe and loss of resolution. The loss degree of the resolution depends on the performance of window function. The multi-degree-of-freedom FM signal has more frequency-modulation degrees of freedom, so that an optimal signal can be found by using an optimization method.

At present, the research on the multi-degree-of-freedom FM signal focuses on signal design and application. The existing research mainly focuses on multi-degree-of-freedom FM signal design in pulse Doppler radar system. There are three design methods: 1) according to the principle of stationary phase, designing a specific window function to obtain the complete signal; 2) based on the least square method and other optimization methods, approximating the power spectrum of the specific window function; and 3) in order to overcome the problem that the multi-degree-of-freedom FM signal is sensitive to Doppler frequency domain, designing the multi-degree-of-freedom FM signal by windowing magnitude in conjunction with the first method. However, when the sidelobe suppression is performed by adopting the methods, the main lobe is widened inevitably and the width of the main lobe is not restricted, which will result in a decrease in resolution.

Based on the advantages of maintaining the SNR of the system of the multi-degree-of-freedom FM signal, in the current SAR radar large time-width signal design and sidelobe control, the urgent problem to be solved is how to design an optimized multi-degree-of-freedom FM signal capable of performing the sidelobe suppression furthest and widening the main lobe minimally.

SUMMARY

In view of this, the embodiments of the disclosure provide a method and a device for designing and optimizing the multi-degree-of-freedom FM signal, thereby performing sidelobe suppression as much as possible without widening the main lobe, or suppressing the main lobe as much as possible without raising the sidelobes.

In order to achieve the above purpose, the technical solution of the disclosure is achieved as follows.

The disclosure provides a method for designing and optimizing the multi-degree-of-freedom FM signal. The method includes the following operations.

A time domain function of the multi-degree-of-freedom FM signal is determined; constraint condition and objective function of multi-degree-of-freedom FM signal optimization are established; an algorithm model of augmented Lagrangian genetic algorithm is determined based on the constraint condition and the objective function; characteristic parameters of first iteration of the algorithm model are initialized, where the characteristic parameters of the first iteration at least include the Lagrange multiplier of the first iteration and the offset of the first iteration; an initialization signal of the multi-degree-of-freedom FM signal is acquired, and initialization frequency control points of the initialization signal are determined based on the initialization signal; fitness of the initialization frequency control points, the Lagrange multiplier of second iteration and the offset of the second iteration are calculated based on the characteristic parameters of the first iteration and the initialization frequency control points by using the algorithm model; frequency control points of the second iteration are determined from the initialization frequency control points based on the fitness by using a selection strategy; frequency control points of third iteration are determined based on the frequency control points of the second iteration, the Lagrange multiplier of the second iteration and the offset of the second iteration by using the algorithm model and the selection strategy; iterations of the Lagrange multiplier and the offset are continuously performed based on the algorithm model and the selection strategy, until the augmented Lagrangian genetic algorithm converges to obtain an optimized multi-degree-of-freedom FM signal; and signal transmission is performed by adopting the optimized multi-degree-of-freedom FM signal.

The operation that the time domain function of the multi-degree-of-freedom FM signal is determined may include the following actions. The time-frequency function of the multi-degree-of-freedom FM signal is established in the form of piecewise linear function, and the time domain function of the multi-degree-of-freedom FM signal is determined based on the time-frequency function.

The operation that the time-frequency function of the multi-degree-of-freedom FM signal is established in the form of the piecewise linear function may include the following actions.

In Cartesian coordinate system, the coordinate of time-frequency relation of the multi-degree-of-freedom FM signal is defined to be (t, f). The pulse width of the multi-degree-of-freedom FM signal is defined to be T. The bandwidth is defined to be B. The time-frequency function of the multi-degree-of-freedom FM signal is constructed by 2n+2 stages of piecewise linear functions. In a time-frequency relation coordinate plane, time piecewise points are uniformly distributed, and there are 2n+3 time piecewise points as follows:

$$t_s = \left[-\frac{T}{2}, T_{2n}, \ldots, T_{21}, 0, T_{11}, \ldots, T_{1n}, \frac{T}{2}\right]^T, \text{ where}$$

$$T_{1i} = \frac{T}{2n+2}i, \quad T_{2i} = -\frac{T}{2n+2}i,$$

(i=1, 2, ..., n) are known quantities. In the time-frequency relation coordinate plane, 2n frequency control points are given and expressed as follows: $B_c=[B_{2n}, \ldots, B_{21}, B_{11}, \ldots, B_{1n}]^T$, and corresponding 2n+3 frequency piecewise points can be expressed as follows:

$$B_s = \left[-\frac{B}{2}, B_{2n}, \ldots, B_{21}, 0, B_{11}, \ldots, B_{1n}, \frac{B}{2}\right]^T.$$

The piecewise linear function of the time-frequency function can be expressed as follows:

$$f(t) = \begin{cases} B_{2n} + k_{2n}(t - T_{2n}) & -T/2 \le t < T_{2n} \\ \ldots & \ldots \\ B_{21} + k_{21}(t - T_{21}) & T_{22} \le t < T_{21} \\ k_{20}t & T_{21} \le t < 0 \\ k_{10}t & 0 \le t < T_{11} \\ B_{11} + k_{11}(t - T_{11}) & T_{11} \le t < T_{12} \\ \ldots & \ldots \\ B_{1n} + k_{1n}(t - T_{1n}) & T_{1n} \le t < T/2 \end{cases},$$

where $k_{1i}$ and $k_{2i}$ are frequency modulation rates of stages of the piecewise linear function and can be expressed as follows:

$$k_{10} = \frac{B_{11}}{T_{11}}, \ldots, K_{1i} = \frac{B_{1(i+1)} - B_{1i}}{T_{1(i+1)} - T_{1i}}\Big|_{1 \le i < n}, \ldots, k_{1n} = \frac{\frac{B}{2} - B_{1n}}{\frac{T}{2} - T_{1n}}$$

$$k_{20} = \frac{B_{21}}{T_{21}}, \ldots, K_{2i} = \frac{B_{2(i+1)} - B_{2i}}{T_{2(i+1)} - T_{2i}}\Big|_{1 \le i < n}, \ldots, k_{2n} = \frac{\frac{B}{2} + B_{2n}}{\frac{T}{2} + T_{2n}}.$$

The operation that the constraint condition and the objective function of the multi-degree-of-freedom FM signal optimization are established may include the following action. The constraint condition and the objective function of the multi-degree-of-freedom FM signal optimization are established based on the main lobe width (MW) and the peak sidelobe ratio (PSLR) in the performance of the autocorrelation function of the multi-degree-of-freedom FM signal.

The selection strategy may include roulette wheel selection (RWS) rule and crossover and mutation rule.

The time domain function of the multi-degree-of-freedom FM signal can be expressed as follows:

$$s(t) = A \exp(j2\pi\int_0^t f(t)dt),$$

where A is signal amplitude, and f(t) is the time-frequency function.

The operation that the constraint condition and the objective function of the multi-degree-of-freedom FM signal optimization are established based on the MW and the PSLR in the performance of the autocorrelation function of the multi-degree-of-freedom FM signal may include the following actions.

According to ideal performance of the autocorrelation function of the multi-degree-of-freedom FM signal, based on a principle of sidelobe suppression as much as possible without widening the main lobe, the constraint condition and the objective function of the multi-degree-of-freedom FM signal optimization can be established as follows:

$$\min_{B_c} f(PSLR), \text{ such that}$$

$$c(MW) \le 0, \quad -B/2 \le B_c \le B/2,$$

where c(MW) is nonlinear constraint of the MW.

The operations that the initialization signal of the multi-degree-of-freedom FM signal is acquired and the initialization frequency control points of the initialization signal are determined based on the initialization signal may include the following actions.

The window function P(f) is selected as a power spectrum of the multi-degree-of-freedom FM signal, and the group delay function can be calculated as follows:

$$T(f) = \int_0^f \frac{P(f)}{C} df,$$

where $$C = \frac{1}{T}\int_{-B/2}^{B/2} P(f)df.$$

The time-frequency function of the initialization signal can be expressed as follows:

$$f(t) = T^{-1}(f).$$

Based on the above inverse function, the initialization signal can be solved by using numerical method. $B_s$ can be obtained according to the time piecewise points $t_s$, and then frequency piecewise points $B_c$ namely the initialization frequency control points, can be obtained.

The operation that the algorithm model of the augmented Lagrangian genetic algorithm is determined based on the constraint condition and the objective function may include the following actions.

The constraint condition and the objective function are converted to:

$$\Theta(B_c, \lambda, s) = f(B_c) - \lambda s \log(s - c(B_c)),$$

where $f(B_c) = PSLR(B_c)$, $PSLR(B_c)$ is the PSLR of the multi-degree-of-freedom FM signal obtained according to the frequency control points $B_c$; $c(B_c) = MW(B_c) - a$, $MW(B_c)$ is the MW of the multi-degree-of-freedom FM signal obtained according to the frequency control points $B_c$; and a is a constraint value of the main lobe.

The disclosure further provides a device for designing and optimizing a multi-degree-of-freedom FM signal. The device includes a time-frequency function establishing unit, an algorithm model determining unit, an algorithm parameter initialization unit, a frequency control point initialization unit and an iteration unit.

The time-frequency function establishing unit is configured to determine a time domain function of the multi-degree-of-freedom FM signal.

The algorithm model determining unit is configured to establish constraint condition and objective function of multi-degree-of-freedom FM signal optimization. The algorithm model determining unit is further configured to determine an algorithm model of augmented Lagrangian genetic algorithm based on the constraint condition and the objective function.

The algorithm parameter initialization unit is configured to initialize characteristic parameters of first iteration of the algorithm model, where the characteristic parameters of the first iteration at least include the Lagrange multiplier of the first iteration and the offset of the first iteration.

The frequency control point initialization unit is configured to acquire an initialization signal of the multi-degree-of-freedom FM signal, and determine initialization frequency control points of the initialization signal based on the initialization signal.

The iteration unit is configured to calculate fitness of the initialization frequency control points, the Lagrange multiplier of second iteration and an offset of the second iteration based on the characteristic parameters of the first iteration and the initialization frequency control points by using the algorithm model. The iteration unit is further configured to determine frequency control points of the second iteration from the initialization frequency control points based on the fitness by using a selection strategy. The iteration unit is further configured to determine frequency control points of third iteration based on the frequency control points of the second iteration, the Lagrange multiplier of the second iteration and the offset of the second iteration by using the algorithm model and the selection strategy. The iteration unit is further configured to continuously perform iterations of the Lagrange multiplier and the offset based on the algorithm model and the selection strategy, until the augmented Lagrangian genetic algorithm converges to obtain an optimized multi-degree-of-freedom FM signal. Signal transmission is performed by adopting the optimized multi-degree-of-freedom FM signal.

The disclosure further provides a computer-readable storage medium having stored thereon computer-executable instructions. The computer-executable instructions may be configured to, when executed by a processor, execute the operations of the above method.

According to the method and the device for designing and optimizing a multi-degree-of-freedom FM signal in the disclosure, a time domain function of the multi-degree-of-freedom FM signal is determined. Constraint condition and objective function of multi-degree-of-freedom FM signal optimization are established. An algorithm model of augmented Lagrangian genetic algorithm is determined based on the constraint condition and the objective function. Characteristic parameters of first iteration of the algorithm model are initialized, where the characteristic parameters of the first iteration at least include the Lagrange multiplier of the first iteration and an offset of the first iteration. An initialization signal of the multi-degree-of-freedom FM signal is acquired, and initialization frequency control points of the initialization signal are determined based on the initialization signal. Fitness of the initialization frequency control points, the Lagrange multiplier of second iteration and the offset of the second iteration are calculated based on the characteristic parameters of the first iteration and the initialization frequency control points by using the algorithm model. Frequency control points of the second iteration are determined from the initialization frequency control points based on the fitness by using a selection strategy. Frequency control points of third iteration are determined based on the frequency control points of the second iteration, the Lagrange multiplier of the second iteration and the offset of the second iteration by using the algorithm model and the selection strategy. Iterations of the Lagrange multiplier and the offset are continuously performed based on the algorithm model and the selection strategy, until the augmented Lagrangian genetic algorithm converges to obtain an optimized multi-degree-of-freedom FM signal. Signal transmission is performed by adopting the optimized multi-degree-of-freedom FM signal. Therefore, a large time-width transmit signal can be designed, which is applicable to high-resolution synthetic aperture radar for imaging with a high sensitivity and low sidelobes.

DETAILED DESCRIPTION

The disclosure is further explained in detail in conjunction with the drawings.

Figure 2:
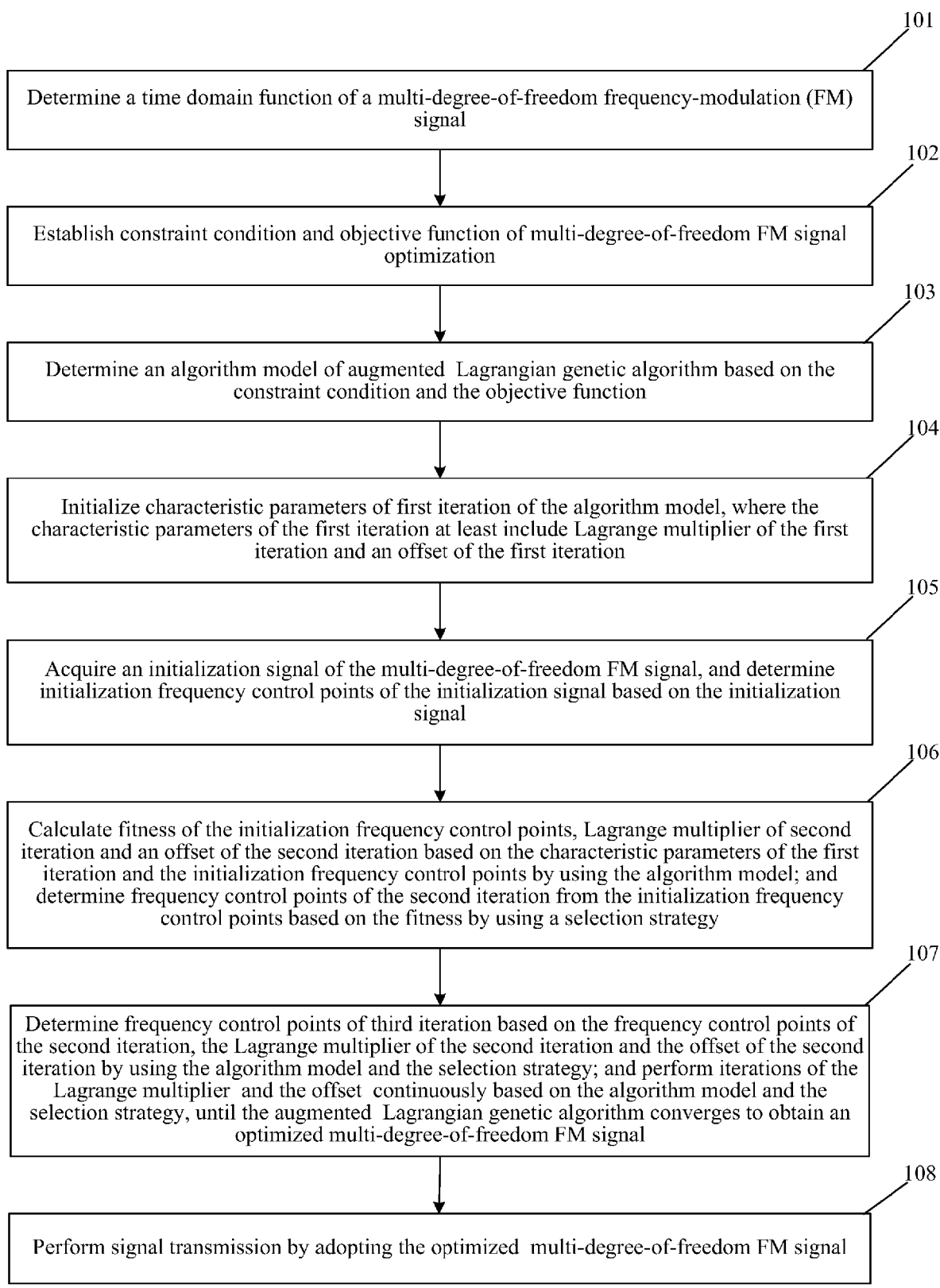
FIG. 2 is a schematic flowchart of a method for designing and optimizing a multi-degree-of-freedom FM signal according to an embodiment of the disclosure.

As illustrated in FIG. 2, the method for designing and optimizing a multi-degree-of-freedom FM signal in the disclosure includes the following operations.

At block 101, a time domain function of the multi-degree-of-freedom FM signal is determined.

Specifically, a time-frequency function of the multi-degree-of-freedom FM signal is established in the form of piecewise linear function, and then the time domain function of the multi-degree-of-freedom FM signal is determined based on the time-frequency function.

Figure 1:
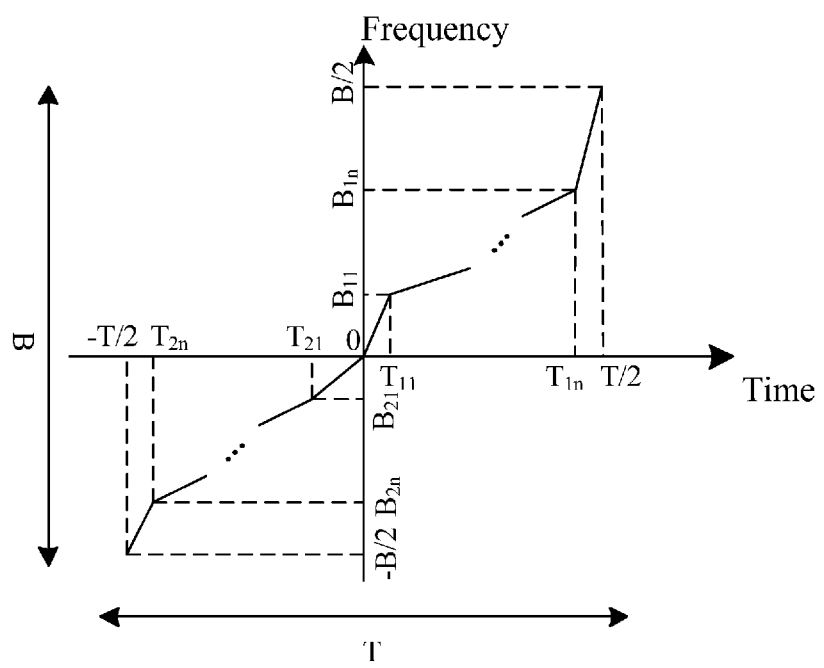
FIG. 1 is a schematic diagram of time-frequency relation of a multi-degree-of-freedom FM signal according to an embodiment of the disclosure.

Specifically, in Cartesian coordinate system, the coordinate of time-frequency relation of the multi-degree-of-freedom FM signal is defined to be (t,f). It is assumed that the pulse width of the multi-degree-of-freedom FM signal is defined to be T, the bandwidth of the multi-degree-of-freedom FM signal is defined to be B, and the time-frequency function of the multi-degree-of-freedom FM signal is constructed by 2n+2 stages of piecewise linear functions, as illustrated in FIG. 1. In a time-frequency relation coordinate plane, time piecewise points, namely abscissa piecewise points are uniformly distributed, and 2n+3 time piecewise points can be expressed as follows:

$$t_s = \left[-\frac{T}{2}, T_{2n}, \ldots, T_{21}, 0, T_{11}, \ldots, T_{1n}, \frac{T}{2}\right]^T, \text{ where}$$

$$T_{1i} = \frac{T}{2n+2}i, \; T_{2i} = -\frac{T}{2n+2}i,$$

(i=1, 2, ... n) are known quantities. In the time-frequency relation coordinate plane, 2n frequency control points are given and expressed as follows: $B_c = [B_{2n}, \ldots, B_{21}, B_{11}, \ldots, B_{1n}]^T$, then corresponding 2n+3 frequency piecewise points can be expressed as follows:

$$B_s = \left[-\frac{B}{2}, B_{2n}, \ldots, B_{21}, 0, B_{11}, \ldots, B_{1n}, \frac{B}{2}\right]^T.$$

When the piecewise points in the time-frequency relation coordinate plane are given, the time-frequency relation of the multi-degree-of-freedom FM signal can be expressed by using the piecewise linear function as follows:

$$f(t) = \begin{cases} B_{2n} + k_{2n}(t - T_{2n}) & -T/2 \le t < T_{2n} \\ \ldots & \ldots \\ B_{21} + k_{21}(t - T_{21}) & T_{22} \le t < T_{21} \\ k_{20}t & T_{21} \le t < 0 \\ k_{10}t & 0 \le t < T_{11} \\ B_{11} + k_{11}(t - T_{11}) & T_{11} \le t < T_{12} \\ \ldots & \ldots \\ B_{1n} + k_{1n}(t - T_{1n}) & T_{1n} \le t < T/2 \end{cases} \quad (1)$$

In the function (1), $k_{1i}$ and $k_{2i}$ represent frequency modulation rates of stages of the piecewise linear function, and the time-frequency relation is illustrated in FIG. 1.

$$k_{10} = \frac{B_{11}}{T_{11}}, \ldots, K_{1i} \underset{1 \le i < n}{=} \frac{B_{1(i+1)} - B_{1i}}{T_{1(i+1)} - T_{1i}}, \ldots, k_{1n} = \frac{\frac{B}{2} - B_{1n}}{\frac{T}{2} - T_{1n}} \quad (2)$$

$$k_{20} = \frac{B_{21}}{T_{21}}, \ldots, K_{2i} \underset{1 \le i < n}{=} \frac{B_{2(i+1)} - B_{2i}}{T_{2(i+1)} - T_{2i}}, \ldots, k_{2n} = \frac{\frac{B}{2} + B_{2n}}{\frac{T}{2} + T_{2n}}. \quad (3)$$

The time domain function of the multi-degree-of-freedom FM signal can be expressed as follows:

$$s(t) = A \exp(j2\pi f_0 \int f(t) dt) \quad (4)$$

In the function (4), A is signal amplitude, and f(t) is the time-frequency function.

At block 102, constraint condition and objective function of multi-degree-of-freedom FM signal optimization are established.

Specifically, the constraint condition and the objective function of the multi-degree-of-freedom FM signal optimization are established based on the main lobe width (MW) and the peak sidelobe ratio (PSLR) in the performance of the autocorrelation function of the multi-degree-of-freedom FM signal.

Specifically, ideal performance of the autocorrelation function of the multi-degree-of-freedom FM signal includes: the main lobe as narrow as possible, the peak sidelobe ratio (PSLR) as low as possible and the rapidly reduced envelope of the sidelobe fluctuation. However, the three ideal performances cannot be satisfied at the same time. Generally, the MW of the autocorrelation function is defined to be less than the peak by 3 dB. It can be known from the definitions in the formulas (1) to (4) that, a specific form of the multi-degree-of-freedom FM signal depends on the control point. Once the number of the frequency control points is determined, the time piecewise points $t_s$ are uniformly distributed on the time axis and are known quantities. The multi-degree-of-freedom FM signal can be defined by the vector $B_s$ including 2n frequency control points. A mathematical model for the multi-degree-of-freedom FM signal optimization, which is based on two key performances of impact response function of point target of an SAR image: the PSLR and the MW, is provided. The mathematical model is for the nonlinear constrained optimization. The requirement of the nonlinear constrained optimization is to perform the sidelobe suppression as much as possible without widening the main lobe, which can be expressed as follows:

$$\min_{B_c} f(PSLR), \text{ such that} \quad (5)$$

$$c(MW) \le 0, \; -B/2 \le B_c \le B/2$$

In the formula (5), c(MW) is nonlinear constraint of the MW.

At block 103, an algorithm model of augmented Lagrangian genetic algorithm is determined based on the constraint condition and the objective function.

Specifically, the augmented Lagrangian genetic algorithm is a generalized form of genetic algorithm, and is advanced algorithm for solving the complex constrained optimization by combining the genetic algorithm and generalized Lagrange algorithm.

The augmented Lagrangian genetic algorithm is mathematically expressed as follows:

$$\Theta(x, \lambda, s, \rho) = \quad (6)$$

$$f(x) - \sum_{i=1}^{m} \lambda_i s_i \log(s_i - c_i(x)) + \sum_{i=m+1}^{mt} \lambda_i ceq_i(x) + \frac{\rho}{2} \sum_{mt}^{i=mt} ceq_i(x)^2$$

In the formula (6), $\lambda_i$ is Lagrange multiplier and is a non-negative number, $s_i$ is a non-negative number and represents a total offset to ensure a nonzero antilogarithm of the logarithm, $\rho$ is penalty factor, $ceq_i(x)$ and $c_i(x)$ are equality constraint and nonlinear inequality constraint respectively, f(x) is fitness function, m is the number of the nonlinear constraints, and mt is the total number of the constraints.

It is required to perform the sidelobe suppression as much as possible without widening the main lobe, which can be expressed as follows:

$$\Theta(B_c, \lambda, s) = f(B_c) - \lambda s \log(s - c(B_c)) \quad (7)$$

In the formula (7), $f(B_c) = PSLR(B_c)$, where $PSLR(B_c)$ is the PSLR of the signal obtained according to the frequency control points $B_c$; $c(B_c) = MW(B_c) - a$, where $MW(B_c)$ is the MW of the multi-degree-of-freedom FM signal obtained according to the frequency control points $B_c$; and a is a constraint value of the main lobe.

Specifically, the specific solution problem is divided into two parts by using the augmented Lagrangian genetic algorithm. One part is traditional genetic algorithm, and the other part is augmented Lagrangian algorithm. The augmented Lagrangian algorithm is used for solving the constraint problem, in which λ and s are continuously updated according to the formula (7).

The optimization problem is simulated as a dynamic optimization process of the natural selection of "survival of the fittest" by using the genetic algorithm. In search space, a chromosome represents a variable to be determined in the specific solution problem, and generally the genetic algorithm includes operations of selection, crossover and mutation of the chromosome. First, the variable is encoded according to the solution problem, fitness of the chromosomes are calculated according to an objective function value, and the chromosomes are selected according to a certain rule. Second, the selected chromosome pairs are crossed according to the mating probability $r_c$ to generate offspring. Finally, the mutation operation is performed on genes on the chromosome according to the certain mutation probability $r_m$, and a new individual is generated in the search space of the variable. In a whole iterative updating optimization process, the chromosome individual with high fitness has high probability to be selected for generating the offspring, and the individual with low fitness is replaced by a better offspring.

In regard to the multi-degree-of-freedom FM signal optimization, in an encoding process of the problem, each chromosome is regarded as the frequency control point vector $B_c$ including 2n frequency components in the embodiment of the disclosure. An initialization signal is selected, so that the frequency control point vector $B_c$ and parameters of the algorithm can be initialized.

At block 104, characteristic parameters of first iteration of the algorithm model are initialized, where the characteristic parameters of the first iteration at least include the Lagrange multiplier of the first iteration and the offset of the first iteration.

Specifically, roulette wheel selection (RWS) rule is used to select male parents to perform crossover process in the disclosure. It is assumed that the total number of the selected chromosomes is K. K random numbers are firstly generated for the K chromosomes in the crossover process. When the random numbers corresponding to the chromosomes are less than the crossover probability $r_c$, it is indicated that the chromosomes are selected for the crossover operation. The crossover operation is performed at one cross point herein, and a position of the cross point is randomly generated. The male parents exchange genes at the cross point to generate a new chromosome. The mutation operation refers to an operation of changing the genes on the chromosome, and the genes to be mutated are randomly selected. In the multi-degree-of-freedom FM signal optimization, the number of genes on each chromosome is 2n, then the total number of the genes can be expressed as follows: L=2Kn. The number M of the mutated genes depends on mutation probability, and can be specifically expressed as follows: M=$r_m$L. The mutation operation is performed on M genes randomly selected from L genes, and mutation operation can be expressed as follows:

$$p_k(i)=p_k(i)*(1+\text{rand}) \quad (8)$$

Algorithm parameters are initialized. The following initialized algorithm parameters are set: the number of chromosomes n, the crossover probability $r_c$, the mutation probability $r_m$, the Lagrange multiplier λ and the offset s.

At block 105, an initialization signal of the multi-degree-of-freedom FM signal is acquired, and initialization frequency control points of the initialization signal are determined based on the initialization signal.

The window function P(f) is selected as a power spectrum of the multi-degree-of-freedom FM signal. Group delay function is calculated as follows:

$$T(f) = \int_0^f \frac{P(f)}{C} df \quad (9)$$

where $$C = \frac{1}{T} \int_{-B/2}^{B/2} P(f) df \quad (10)$$

And the time-frequency function of the multi-degree-of-freedom FM signal can be calculated as follows:

$$f(t)=T^{-1}(f) \quad (11)$$

Generally, in the function (11), an analytical form of an inverse function cannot be obtained. Therefore, the function (11) is solved by using numerical method in the embodiment of the disclosure. After the time-frequency relation is obtained, $B_s$ can be obtained according to the time piecewise points $t_s$, and then the frequency control points $B_c$ are obtained, and the initialization operation is completed.

At block 106, fitness of the initialization frequency control points, the Lagrange multiplier of second iteration and the offset of the second iteration are calculated based on the characteristic parameters of the first iteration and the initialization frequency control points by using the algorithm model; and frequency control points of the second iteration are determined from the initialization frequency control points based on the fitness by using a selection strategy.

Specifically, the selection strategy includes RWS rule and crossover and mutation rule.

Specifically, the multi-degree-of-freedom FM signal corresponding to the control point represented by each chromosome is determined according to the formulas (1) to (4), and autocorrelation operation is performed on the multi-degree-of-freedom FM signal. MW and PSLR of the output signal are calculated. Fitness of the chromosome is calculated according to the formula (7). According to the formula (7), λ and offset s of the next optimization are calculated by using the augmented Lagrangian algorithm. Then the chromosomes are selected according to the RWS rule, and crossover operation is performed at one cross point according to the crossover probability. Finally, the mutation operation in the formula (8) is performed according to the mutation probability $r_m$.

At block 107, frequency control points of third iteration are determined based on the frequency control points of the second iteration, the Lagrange multiplier of the second iteration and the offset of the second iteration by using the algorithm model and the selection strategy. Based on the algorithm model and the selection strategy, iterations of the Lagrange multiplier λ and the offset s are continuously performed, until the augmented Lagrangian genetic algorithm converges to obtain an optimized multi-degree-of-freedom FM signal.

Specifically, the selection strategy includes RWS rule and crossover and mutation rule.

Specifically, based on the obtained next generation of the chromosomes, namely the frequency control points of the second iteration, the fitness, λ and offset s of the next optimization are calculated with reference to the operation at block 106 by using the formula (7). And then the roulette selection, crossover and mutation operations are successively performed. That is, iterations of the Lagrange multiplier λ and the offset s are continuously performed by cycling the operation at block 106, until the augmented Lagrangian genetic algorithm converges. The convergence of the algorithm indicates that multi-degree-of-freedom FM signal design and optimization are completed.

At block 108, signal transmission is performed by adopting the optimized multi-degree-of-freedom FM signal.

In conclusion, according to the embodiment of the disclosure, the operations of an optimization process of a multi-degree-of-freedom FM signal are illustrated as follows.

| Optimization process of multi-degree-of-freedom FM signal | |
| --- | --- |
| Block 1 | Algorithm parameters are initialized. The following initialized algorithm parameters are set: the number of chromosomes n, the crossover probability $r_c$, the mutation probability $r_m$, the Lagrange multiplier λ and the offset s. |
| Block 2 | Based on the principle of stationary phase, an initialization multi-degree-of-freedom FM signal is generated, and initialization frequency control points $B_c$, namely the initialization chromosome, are obtained. |
| Block 3 | The multi-degree-of-freedom FM signal corresponding to the control point represented by each chromosome is determined according to the formulas (1) to (4); the autocorrelation operation is performed on the multi-degree-of-freedom FM signal; MW and PSLR of the output signal are calculated; fitness of the chromosome is calculated according to the formula (7); and λ and offset s of the next optimization are calculated according to the formula (7) by using the augmented Lagrangian algorithm. |
| Block 4 | The chromosomes are selected according to the RWS rule. |
| Block 5 | Crossover operation is performed at one cross point according to the crossover probability $r_c$. |
| Block 6 | Mutation operation in the formula (8) is performed according to the mutation probability $r_m$. |
| Block 7 | The operations at block 3 to block 7 are cycled until the algorithm converges. |

The function of the disclosure will be further described in detail in conjunction with specific examples below.

A multi-degree-of-freedom FM signal is generated according to the principle of stationary phase by using −35 dB of Taylor window function as the power spectrum, and initialization frequency control points of the signal are obtained. The pulse width of the signal is 10 us, the bandwidth is 100 MHz, and the sampling frequency is 120 MHz. The result of the signal optimization is illustrated in Table 1:

TABLE 1

| Waveform | PSLR | MW |
| --- | --- | --- |
| Initialization waveform | −34.3 dB | 1.19 |
| Optimized waveform | −40.3 dB | 1.17 |

The MW is in unit of sampling number. It can be seen from the Table 1 that compared with the initialization signal, the process of the multi-degree-of-freedom FM signal optimization in the disclosure enables the sidelobe of the multi-degree-of-freedom FM signal to be suppressed by 6 dB without widening the main lobe. In addition, it is to be noted that Taylor window is the window function with excellent performance, and the PSLR and MW indexes of the initialization waveform are good enough. According to the method, the sidelobe can further be suppressed by 6 dB without widening the main lobe, thereby the effectiveness of the disclosure can be adequately confirmed.

Figure 3:
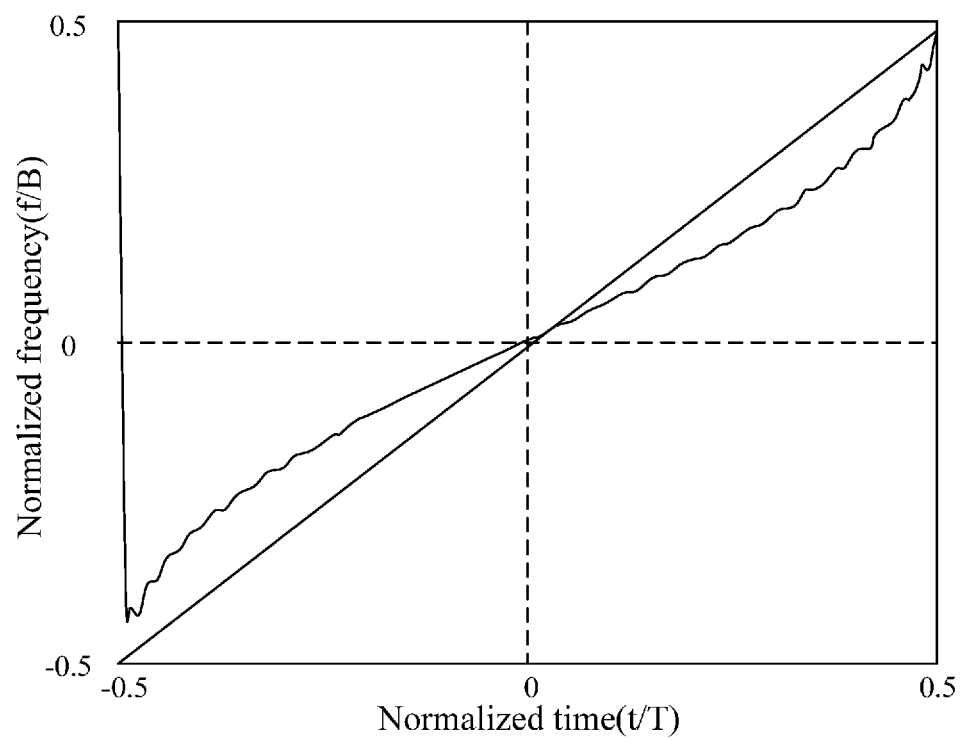
FIG. 3 is a schematic diagram of time-frequency relation of the optimized multi-degree-of-freedom FM signal according to an embodiment of the disclosure.
Figure 4A:
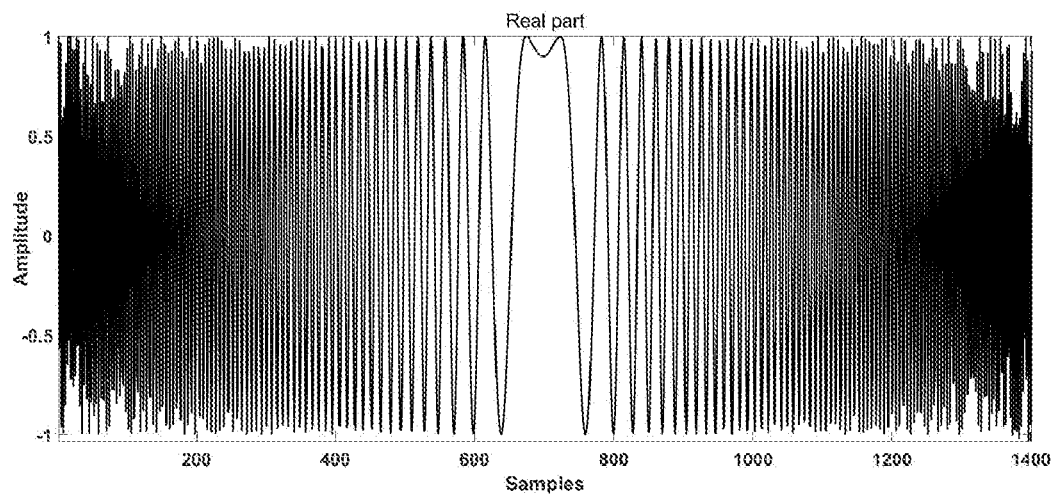
FIG. 4A is a real part of a time domain waveform diagram of the optimized multi-degree-of-freedom FM signal according to an embodiment of the disclosure.
Figure 4B:
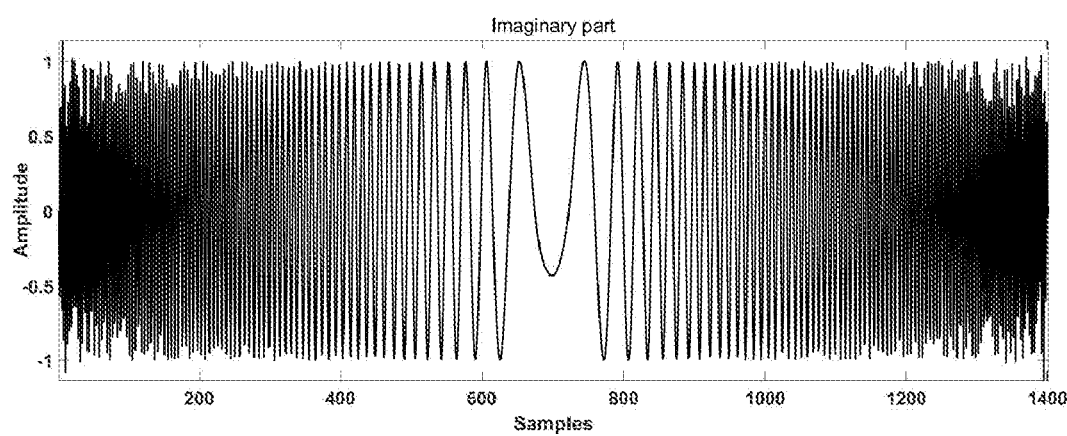
FIG. 4B is an imaginary part of a time domain waveform diagram of the optimized multi-degree-of-freedom FM signal according to an embodiment of the disclosure.
Figure 5:
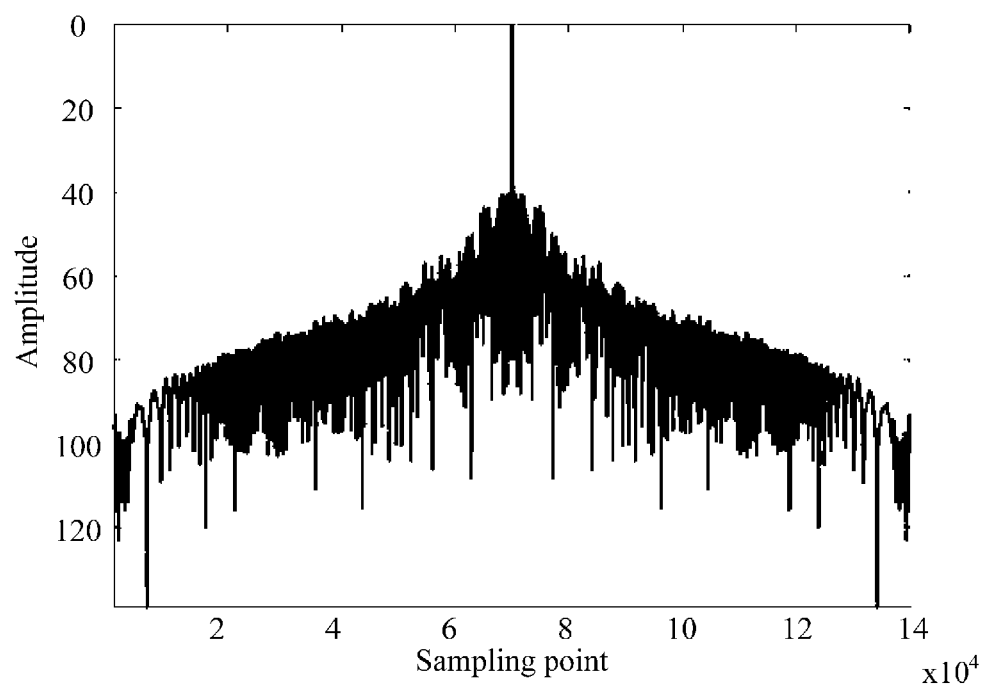
FIG. 5 is an autocorrelation function diagram of the optimized multi-degree-of-freedom FM signal according to an embodiment of the disclosure.

FIGS. 3-5 illustrate a time-frequency relation curve, time domain waveforms and output waveform of autocorrelation function of the optimized multi-degree-of-freedom FM signal. FIGS. 4A-4B are time domain waveform diagrams of the optimized signal. Compared with the LFM signal with the same time width and an equivalent sidelobe level generated by windowing, the optimized signal has capability of maintaining 1.2 dB of the system SNR, which has a great practical engineering significance.

Therefore, the multi-degree-of-freedom FM signal can be effectively designed and optimized by using the method in the disclosure.

Figure 6:
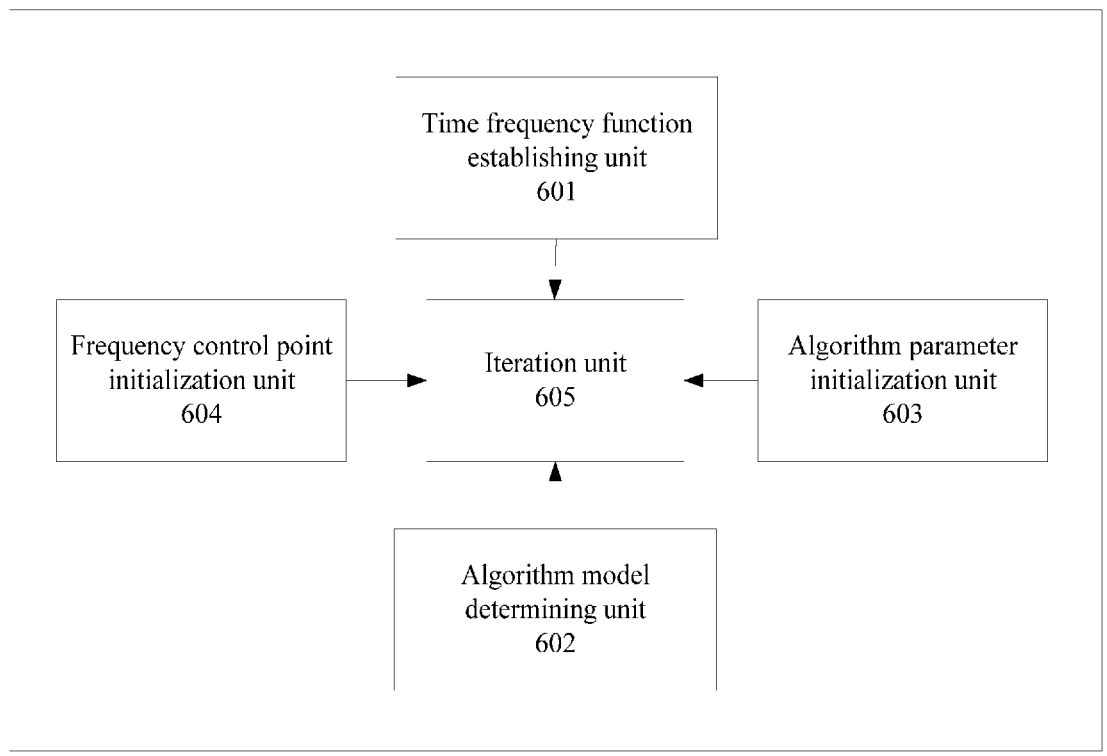
FIG. 6 is a schematic structural diagram of a device for designing and optimizing a multi-degree-of-freedom FM signal according to an embodiment of the disclosure.

The embodiments of the disclosure provide a device for designing and optimizing a multi-degree-of-freedom FM signal. As illustrated in FIG. 6, the device includes a time-frequency function establishing unit 601, an algorithm model determining unit 602, an algorithm parameter initialization unit 603, a frequency control point initialization unit 604 and an iteration unit 605.

The time-frequency function establishing unit 601 is configured to determine a time domain function of the multi-degree-of-freedom FM signal. Specifically, the time-frequency function of the multi-degree-of-freedom FM signal is established in the form of piecewise linear function, and then the time domain function of the multi-degree-of-freedom FM signal is determined based on the time-frequency function.

The algorithm model determining unit 602 is configured to establish constraint condition and objective function of multi-degree-of-freedom FM signal optimization. The algorithm model determining unit 602 is further configured to determine an algorithm model of augmented Lagrangian genetic algorithm based on the constraint condition and the objective function. Specifically, the algorithm model determining unit 602 is further configured to establish the constraint condition and the objective function of the multi-degree-of-freedom FM signal optimization, based on the main lobe width (MW) and the peak sidelobe ratio (PSLR) in the performance of the autocorrelation function of the multi-degree-of-freedom FM signal.

The algorithm parameter initialization unit 603 is configured to initialize characteristic parameters of first iteration of the algorithm model, where the characteristic parameters of the first iteration at least include the Lagrange multiplier of the first iteration and the offset of the first iteration.

The frequency control point initialization unit 604 is configured to acquire an initialization signal of the multi-degree-of-freedom FM signal, and determine initialization frequency control points of the initialization signal based on the initialization signal.

The iteration unit 605 is configured to calculate fitness of the initialization frequency control points, the Lagrange multiplier of second iteration and the offset of the second iteration based on the characteristic parameters of the first iteration and the initialization frequency control points by using the algorithm model. The iteration unit 605 is further configured to determine frequency control points of the second iteration from the initialization frequency control points based on the fitness by using a selection strategy. The iteration unit 605 is further configured to determine frequency control points of third iteration based on the frequency control points of the second iteration, the Lagrange multiplier of the second iteration and the offset of the second iteration by using the algorithm model and the selection strategy. The iteration unit 605 is further configured to continuously perform the iterations of the Lagrange multiplier and the offset based on the algorithm model and the selection strategy, until the augmented Lagrangian genetic algorithm converges to obtain an optimized multi-degree-of-freedom FM signal. Signal transmission is performed by adopting the optimized multi-degree-of-freedom frequency-modulation signal.

Specifically, the selection strategy includes roulette wheel selection (RWS) rule and crossover and mutation rule.

It should be understood by those skilled in the art that, the realized functions of the units in the device for designing and optimizing the multi-degree-of-freedom FM signal as illustrated in FIG. 6 can be understood with reference to the related description of the preceding method for designing and optimizing the multi-degree-of-freedom FM signal. The functions of the units in the device for designing and optimizing the multi-degree-of-freedom FM signal as illustrated in FIG. 6 may be realized by programs running on a processor, and may also be realized by a specific logical circuit.

The embodiments of the disclosure further provide a computer-readable storage medium having stored thereon computer-executable instructions, which when being executed by a processor, to execute the operations of the above method.

The above is merely the embodiments of the disclosure and is not intended to limit the scope of protection of the disclosure.

The invention claimed is:

1. A method for designing and optimizing a multi-degree-of-freedom frequency-modulation (FM) signal, comprising:
   determining a time domain function of the multi-degree-of-freedom FM signal;
   establishing a constraint condition and an objective function for optimizing the multi-degree-of-freedom FM signal;
   determining an algorithm model of an augmented Lagrangian genetic algorithm based on the constraint condition and the objective function;
   initializing characteristic parameters of a first iteration of the algorithm model, wherein the characteristic parameters of the first iteration at least comprise a Lagrange multiplier of the first iteration and an offset of the first iteration;
   acquiring an initialization signal of the multi-degree-of-freedom FM signal, and determining initialization frequency control points of the initialization signal based on the initialization signal;
   calculating fitness of the initialization frequency control points, a Lagrange multiplier of a second iteration and an offset of the second iteration based on the characteristic parameters of the first iteration and the initialization frequency control points by using the algorithm model;
   determining frequency control points of the second iteration from the initialization frequency control points based on the fitness by using a selection strategy;
   determining frequency control points of a third iteration based on the frequency control points of the second iteration, the Lagrange multiplier of the second iteration and the offset of the second iteration by using the algorithm model and the selection strategy;
   continuously performing iterations of the Lagrange multiplier and the offset based on the algorithm model and the selection strategy until the augmented Lagrangian genetic algorithm converges to obtain an optimized multi-degree-of-freedom FM signal; and
   performing signal transmission by adopting the optimized multi-degree-of-freedom FM signal.

2. The method for designing and optimizing the multi-degree-of-freedom FM signal according to claim 1, wherein the operation of determining the time domain function of the multi-degree-of-freedom FM signal comprises:
   establishing the time-frequency function of the multi-degree-of-freedom FM signal in the form of a piecewise linear function, and determining a time domain function of the multi-degree-of-freedom FM signal based on the time-frequency function, wherein the operation of establishing the time-frequency function of the multi-degree-of-freedom FM signal in the form of the piecewise linear function comprises:
   in a Cartesian coordinate system, defining a coordinate of a time-frequency relation of the multi-degree-of-freedom FM signal to be (t, f), defining a pulse width of the multi-degree-of-freedom FM signal to be T, defining a bandwidth to be B, and constructing the time-frequency function of the multi-degree-of-freedom FM signal by 2n+2 stages of piecewise linear functions, wherein in a time-frequency relation coordinate plane, time piecewise points are uniformly distributed, and there are 2n+3 time piecewise point as follows:

$$t_s = \left[-\frac{T}{2}, T_{2n}, \ldots, T_{21}, 0, T_{11}, \ldots, T_{1n}, \frac{T}{2}\right]^T,$$

$$T_{1i} = \frac{T}{2n+2}i, T_{2i} = -\frac{T}{2n+2}i,$$

(i=1, 2, . . . , n) being known quantities;

in the time-frequency relation coordinate plane, 2n frequency control points are given and expressed as follows: $B_c=[B_{2n}, \ldots, B_{21}, B_{11}, \ldots, B_{1n}]^T$, corresponding 2n+3 frequency piecewise points are expressed as follows:

$$B_s = \left[-\frac{B}{2}, B_{2n}, \ldots, B_{21}, 0, B_{11}, \ldots, B_{1n}, \frac{B}{2}\right]^T,$$

and the piecewise linear function of the time-frequency function is expressed as follows:

$$f(t) = \begin{cases} B_{2n} + k_{2n}(t - T_{2n}) & -T/2 \le t < T_{2n} \\ \ldots & \ldots \\ B_{21} + k_{21}(t - T_{21}) & T_{22} \le t < T_{21} \\ k_{20}t & T_{21} \le t < 0 \\ k_{10}t & 0 \le t < T_{11} \\ B_{11} + k_{11}(t - T_{11}) & T_{11} \le t < T_{12} \\ \ldots & \ldots \\ B_{1n} + k_{1n}(t - T_{1n}) & T_{1n} \le t < T/2 \end{cases},$$

where $k_{1i}$ and $k_{2i}$ are frequency modulation rates of stages of the piecewise linear function and are expressed as follows:

$$k_{10} = \frac{B_{11}}{T_{11}}, \ldots, k_{1i} \underset{1 \le i < n}{=} \frac{B_{1(i+1)} - B_{1i}}{T_{1(i+1)} - T_{1i}}, \ldots, k_{1n} = \frac{\frac{B}{2} - B_{1n}}{\frac{T}{2} - T_{1n}},$$

$$k_{20} = \frac{B_{21}}{T_{21}}, \ldots, k_{2i} \underset{1 \le i < n}{=} \frac{B_{2(i+1)} - B_{2i}}{T_{2(i+1)} - T_{2i}}, \ldots, k_{2n} = \frac{\frac{B}{2} + B_{2n}}{\frac{T}{2} + T_{2n}}.$$

3. The method for designing and optimizing the multi-degree-of-freedom FM signal according to claim 1, wherein the operation of establishing the constraint condition and the objective function for optimizing the multi-degree-of-freedom FM signal comprises:
establishing the constraint condition and the objective function for optimizing the multi-degree-of-freedom FM signal based on a main lobe width (MW) and a peak sidelobe ratio (PSLR) in a performance of an autocorrelation function of the multi-degree-of-freedom FM signal.

4. The method for designing and optimizing the multi-degree-of-freedom FM signal according to claim 1, wherein the selection strategy comprises a roulette wheel selection (RWS) rule and a crossover and mutation rule.

5. The method for designing and optimizing the multi-degree-of-freedom FM signal according to claim 1, wherein the time-frequency function of the multi-degree-of-freedom FM signal is expressed as follows:

$$s(t) = A \exp(j2\pi f_0 f(t)dt),$$

where A is a signal amplitude, and f(t) is the time-frequency function.

6. The method for designing and optimizing the multi-degree-of-freedom FM signal according to claim 3, wherein the operation of establishing the constraint condition and the objective function for optimizing the multi-degree-of-freedom FM signal based on the MW and the PSLR in the performance of the autocorrelation function of the multi-degree-of-freedom FM signal comprises:
establishing the constraint condition and the objective function for optimizing the multi-degree-of-freedom FM signal according to an ideal performance of the autocorrelation function of the multi-degree-of-freedom FM signal based on a principle of sidelobe suppression without widening a main lobe:

$$\min_{B_c} f(PSLR), \text{ such that}$$

$$c(MW) \le 0, -B/2 \le B_c \le B/2,$$

where c(MW) is a nonlinear constraint of the MW.

7. The method for designing and optimizing the multi-degree-of-freedom FM signal according to claim 1, wherein the operation of acquiring an initialization signal of the multi-degree-of-freedom FM signal and determining the initialization frequency control points of the initialization signal based on the initialization signal comprises:
selecting a window function P(f) as a power spectrum of the multi-degree-of-freedom FM signal, and calculating a group delay function as follows:

$$T(f) = \int_0^f \frac{P(f)}{C} df,$$

$$\text{where } C = \frac{1}{T} \int_{-B/2}^{B/2} P(f) df,$$

the time-frequency function of the initialization signal is expressed as follows:

$$f(t) = T^{-1}(f),$$

based on the above inverse function, solving the initialization signal by using a numerical method, obtaining $B_s$ according to the time piecewise point $t_s$, and obtaining frequency piecewise points $B_c$, the frequency piecewise points $B_c$ being the initialization frequency control points.

8. The method for designing and optimizing the multi-degree-of-freedom FM signal according to claim 1, wherein the operation of determining the algorithm model of the augmented Lagrangian genetic algorithm based on the constraint condition and the objective function comprises:
converting the constraint condition and the objective function to:

$$\Theta(B_c, \lambda, s) = f(B_c) - s \log(s - c(B_c)),$$

where $f(B_c) = PSLR(B_c)$, $PSLR(B_c)$ being the PSLR of the multi-degree-of-freedom FM signal obtained according to the frequency control points $B_c$; $c(B_c) = MW(B_c) - a$, $MW(B_c)$ being the MW of the multi-degree-of-freedom FM signal obtained according to the frequency control points $B_c$; and a is a constraint value of a main lobe.

9. A device for designing and optimizing a multi-degree-of-freedom frequency-modulation (FM) signal, comprising:
a processor; and
a memory storing instructions, which, when executed by the processor, cause the processor to execute operations comprising:
determining a time domain function of the multi-degree-of-freedom FM signal;
establishing a constraint condition and an objective function for optimizing the multi-degree-of-freedom FM signal; and determining an algorithm model of an augmented Lagrangian genetic algorithm based on the constraint condition and the objective function;
initializing characteristic parameters of a first iteration of the algorithm model, wherein the characteristic parameters of the first iteration at least comprise a Lagrange multiplier of the first iteration and an offset of the first iteration;
acquiring an initialization signal of the multi-degree-of-freedom FM signal, and determine initialization frequency control points of the initialization signal based on the initialization signal;
calculating fitness of the initialization frequency control points, a Lagrange multiplier of a second iteration and an offset of the second iteration based on the characteristic parameters of the first iteration and the initialization frequency control points by using the algorithm model;
determining frequency control points of the second iteration from the initialization frequency control points based on the fitness by using selection strategy;
determining frequency control points of a third iteration based on the frequency control points of the second iteration, the Lagrange multiplier of the second iteration and the offset of the second iteration by using the algorithm model and the selection strategy;

continuously performing iterations of the Lagrange multiplier and the offset based on the algorithm model and the selection strategy, until the augmented Lagrangian genetic algorithm converges to obtain an optimized multi-degree-of-freedom FM signal; and performing signal transmission by adopting the optimized multi-degree-of-freedom FM signal.

10. The device for designing and optimizing a multi-degree-of-freedom FM signal according to claim 9, wherein the operation of determining the time domain function of the multi-degree-of-freedom FM signal comprises:

establishing the time-frequency function of the multi-degree-of-freedom FM signal in the form of a piecewise linear function, and determining a time domain function of the multi-degree-of-freedom FM signal based on the time-frequency function, wherein the operation of establishing the time-frequency function of the multi-degree-of-freedom FM signal in the form of the piecewise linear function comprises:

in a Cartesian coordinate system, defining a coordinate of a time-frequency relation of the multi-degree-of-freedom FM signal to be (t, f), defining a pulse width of the multi-degree-of-freedom FM signal to be T, defining a bandwidth to be B, and constructing the time-frequency function of the multi-degree-of-freedom FM signal by 2n+2 stages of piecewise linear functions, wherein in a time-frequency relation coordinate plane, time piecewise points are uniformly distributed, and there are 2n+3 time piecewise point as follows:

$$t_s = \left[-\frac{T}{2}, T_{2n}, \ldots, T_{21}, 0, T_{11}, \ldots, T_{1n}, \frac{T}{2}\right]^T,$$

$$T_{1i} = \frac{T}{2n+2}i, T_{2i} = -\frac{T}{2n+2}i,$$

(i=1, 2, . . . , n) being known quantities;

in a time-frequency relation coordinate plane, 2n frequency control points are given and expressed as follows: $B_c=[B_{2n}, \ldots, B_{21}, B_{11}, \ldots, B_{1n}]^T$, corresponding 2n+3 frequency piecewise points are expressed as follows:

$$B_s = \left[-\frac{B}{2}, B_{2n}, \ldots, B_{21}, 0, B_{11}, \ldots, B_{1n}, \frac{B}{2}\right]^T,$$

and the piecewise linear function of the time-frequency function is expressed as follows:

$$f(t) = \begin{cases} B_{2n} + k_{2n}(t - T_{2n}) & -T/2 \leq t < T_{2n} \\ \ldots & \ldots \\ B_{21} + k_{21}(t - T_{21}) & T_{22} \leq t < T_{21} \\ k_{20}t & T_{21} \leq t < 0 \\ k_{10}t & 0 \leq t < T_{11} \\ B_{11} + k_{11}(t - T_{11}) & T_{11} \leq t < T_{12} \\ \ldots & \ldots \\ B_{1n} + k_{1n}(t - T_{1n}) & T_{1n} \leq t < T/2 \end{cases},$$

where $k_{1i}$ and $k_{2i}$ are frequency modulation rates of stages of the piecewise linear function and are expressed as follows:

$$k_{10} = \frac{B_{11}}{T_{11}}, \ldots, k_{1i}\bigg|_{1\leq i<n} = \frac{B_{1(i+1)} - B_{1i}}{T_{1(i+1)} - T_{1i}}, \ldots, k_{1n} = \frac{\frac{B}{2} - B_{1n}}{\frac{T}{2} - T_{1n}},$$

$$k_{20} = \frac{B_{21}}{T_{21}}, \ldots, k_{2i}\bigg|_{1\leq i<n} = \frac{B_{2(i+1)} - B_{2i}}{T_{2(i+1)} - T_{2i}}, \ldots, k_{2n} = \frac{\frac{B}{2} + B_{2n}}{\frac{T}{2} + T_{2n}}.$$

11. The device for designing and optimizing the multi-degree-of-freedom FM signal according to claim 9, wherein the operation of establishing the constraint condition and the objective function for optimizing the multi-degree-of-freedom FM signal comprises:

establishing the constraint condition and the objective function for optimizing the multi-degree-of-freedom FM signal based on a main lobe width (MW) and a peak sidelobe ratio (PSLR) in a performance of an autocorrelation function of the multi-degree-of-freedom FM signal.

12. The device for designing and optimizing the multi-degree-of-freedom FM signal according to claim 9, wherein the selection strategy comprises a roulette wheel selection (RWS) rule and a crossover and mutation rule.

13. The device for designing and optimizing the multi-degree-of-freedom FM signal according to claim 9, wherein the time-frequency function of the multi-degree-of-freedom FM signal is expressed as follows:

$$s(t)=A \exp(j2\pi f_0^t f(t)dt),$$

where A is a signal amplitude, and f(t) is the time-frequency function.

14. The device for designing and optimizing the multi-degree-of-freedom FM signal according to claim 11, wherein the operation of establishing the constraint condition and the objective function for optimizing the multi-degree-of-freedom FM signal based on the MW and the PSLR in the performance of the autocorrelation function of the multi-degree-of-freedom FM signal comprises:

establishing the constraint condition and the objective function for optimizing the multi-degree-of-freedom FM signal according to an ideal performance of the autocorrelation function of the multi-degree-of-freedom FM signal based on a principle of sidelobe suppression without widening a main lobe:

$$\min_{B_c} f(PSLR), \text{ such that}$$

$$c(MW) \leq 0, -B/2 \leq B_c \leq B/2,$$

where c(MW) is a nonlinear constraint of the MW.

15. The device for designing and optimizing the multi-degree-of-freedom FM signal according to claim 9, wherein the operation of acquiring an initialization signal of the multi-degree-of-freedom FM signal and determining the initialization frequency control points of the initialization signal based on the initialization signal comprises:

selecting a window function P(f) as a power spectrum of the multi-degree-of-freedom FM signal, and calculating a group delay function as follows:

$$T(f) = \int_0^f \frac{P(f)}{C} df,$$

-continued where $C = \frac{1}{T} \int_{-B/2}^{B/2} P(f) df$, the time-frequency function of the initialization signal is expressed as follows:

$f(t) = T^{-1}(f)$, based on the above inverse function, solving the initialization signal by using a numerical method, obtaining $B_s$ according to the time piecewise point $t_s$, and obtaining frequency piecewise points $B_c$, the frequency piecewise points $B_c$ being the initialization frequency control points.

16. The device for designing and optimizing the multi-degree-of-freedom FM signal according to claim 9, wherein the operation of determining the algorithm model of the augmented Lagrangian genetic algorithm based on the constraint condition and the objective function comprises:

converting the constraint condition and the objective function to:

$\Theta(B_c, \lambda, s) = f(B_c) - s \log(s - c(B_c))$, where $f(B_c) = PSLR(B_c)$, $PSLR(B_c)$ being the PSLR of the multi-degree-of-freedom FM signal obtained according to the frequency control points $B_c$; $c(B_c) = MW(B_c) - a$, $MW(B_c)$ being the MW of the multi-degree-of-freedom FM signal obtained according to the frequency control points $B_c$; and a is a constraint value of a main lobe.

17. A non-transitory computer-readable storage medium having stored thereon computer-executable instructions, which when being executed by a processor, to execute operations comprising:

determining a time domain function of the multi-degree-of-freedom frequency-modulation (FM) signal;

establishing a constraint condition and an objective function for optimizing the multi-degree-of-freedom FM signal;

determining an algorithm model of an augmented Lagrangian genetic algorithm based on the constraint condition and the objective function;

initializing characteristic parameters of a first iteration of the algorithm model, wherein the characteristic parameters of the first iteration at least comprise a Lagrange multiplier of the first iteration and an offset of the first iteration;

acquiring an initialization signal of the multi-degree-of-freedom FM signal, and determining initialization frequency control points of the initialization signal based on the initialization signal;

calculating fitness of the initialization frequency control points, a Lagrange multiplier of second iteration and an offset of the second iteration based on the characteristic parameters of the first iteration and the initialization frequency control points by using the algorithm model;

determining frequency control points of the second iteration from the initialization frequency control points based on the fitness by using a selection strategy;

determining frequency control points of a third iteration based on the frequency control points of the second iteration, the Lagrange multiplier of the second iteration and the offset of the second iteration by using the algorithm model and the selection strategy;

continuously performing iterations of the Lagrange multiplier and the offset based on the algorithm model and the selection strategy until the augmented Lagrangian genetic algorithm converges to obtain an optimized multi-degree-of-freedom FM signal; and performing signal transmission by adopting the optimized multi-degree-of-freedom FM signal.

18. The non-transitory computer-readable storage medium according to claim 17, wherein the operation of determining the time domain function of the multi-degree-of-freedom FM signal comprises:

establishing the time-frequency function of the multi-degree-of-freedom FM signal in the form of a piecewise linear function, and determining a time domain function of the multi-degree-of-freedom FM signal based on the time-frequency function, wherein the operation of establishing the time-frequency function of the multi-degree-of-freedom FM signal in the form of the piecewise linear function comprises:

in a Cartesian coordinate system, defining a coordinate of a time-frequency relation of the multi-degree-of-freedom FM signal to be (t, f), defining a pulse width of the multi-degree-of-freedom FM signal to be T, defining a bandwidth to be B, and constructing the time-frequency function of the multi-degree-of-freedom FM signal by 2n+2 stages of piecewise linear functions, wherein in a time-frequency relation coordinate plane, time piecewise points are uniformly distributed, and there are 2n+3 time piecewise point as follows:

$$t_s = \left[ -\frac{T}{2}, T_{2n}, \ldots, T_{21}, 0, T_{11}, \ldots, T_{1n}, \frac{T}{2} \right]^T,$$

$$T_{1i} = \frac{T}{2n+2} i, T_{2i} = -\frac{T}{2n+2} i,$$

(i=12, . . . , n) being known quantities;

in the time-frequency relation coordinate plane, 2n frequency control points are given and expressed as follows: $B_c = [B_{2n}, \ldots, B_{21}, B_{11}, \ldots, B_{1n}]^T$, corresponding 2n+3 frequency piecewise points are $$B_s = \left[ -\frac{B}{2}, B_{2n}, \ldots, B_{21}, 0, B_{11}, \ldots, B_{1n}, \frac{B}{2} \right]^T,$$

and the piecewise linear function of the time-frequency function is expressed as follows:

$$f(t) = \begin{cases} B_{2n} + k_{2n}(t - T_{2n}) & -T/2 \leq t < T_{2n} \\ \ldots & \ldots \\ B_{21} + k_{21}(t - T_{21}) & T_{22} \leq t < T_{21} \\ k_{20}t & T_{21} \leq t < 0 \\ k_{10}t & 0 \leq t < T_{11} \\ B_{11} + k_{11}(t - T_{11}) & T_{11} \leq t < T_{12} \\ \ldots & \ldots \\ B_{1n} + k_{1n}(t - T_{1n}) & T_{1n} \leq t < T/2 \end{cases},$$

where $k_{1i}$ and $k_{2i}$ are frequency modulation rates of stages of the piecewise linear function and are expressed as follows:

$$k_{10} = \frac{B_{11}}{T_{11}}, \ldots, \underset{1 \leq i < n}{k_{1i}} = \frac{B_{1(i+1)} - B_{1i}}{T_{1(i+1)} - T_{1i}}, \ldots, k_{1n} = \frac{\frac{B}{2} - B_{1n}}{\frac{T}{2} - T_{1n}},$$

$$k_{20} = \frac{B_{21}}{T_{21}}, \ldots, \underset{1\leq i<n}{k_{2i}} = \frac{B_{2(i+1)} - B_{2i}}{T_{2(i+1)} - T_{2i}}, \ldots, k_{2n} = \frac{\frac{B}{2} + B_{2n}}{\frac{T}{2} + T_{2n}}.$$

19. The non-transitory computer-readable storage medium according to claim 17, wherein the operation of establishing the constraint condition and the objective function for optimizing the multi-degree-of-freedom FM signal comprises:

establishing the constraint condition and the objective function for optimizing the multi-degree-of-freedom FM signal based on a main lobe width (MW) and a peak sidelobe ratio (PSLR) in a performance of an autocorrelation function of the multi-degree-of-freedom FM signal.

20. The non-transitory computer-readable storage medium according to claim 17, wherein the time-frequency function of the multi-degree-of-freedom FM signal is expressed as follows:

$s(t) = A \exp(j2\pi \int_0^t f(t)dt)$, where A is a signal amplitude, and f(t) is the time-frequency function.

* * * * *